US010479944B2

(12) United States Patent
Li et al.

(10) Patent No.: US 10,479,944 B2
(45) Date of Patent: Nov. 19, 2019

(54) CATALYST FOR PREPARING BIOLOGICAL AVIATION KEROSENE WITH CASTOR OIL, PREPARATION METHOD AND APPLICATION THEREOF

(71) Applicants: Nankai University, Tianjin (CN); Tianjin Nankai University Castor Engineering Science and Technology Co., Ltd., Tianjin (CN); TIANJIN BINENG SCIENCE AND TECHNOLOGY CO.,LTD., Tianjin (CN)

(72) Inventors: Wei Li, Tianjin (CN); SiYang Liu, Tianjin (CN); Qingxin Guan, Tianjin (CN); Bohan Chai, Tianjin (CN); Liangnian He, Tianjin (CN); Feng Ye, Tianjin (CN); Xiaoying Cui, Tianjin (CN)

( * ) Notice: Subject to any disclaimer, the term of this patent is extended or adjusted under 35 U.S.C. 154(b) by 13 days.

(21) Appl. No.: 15/817,168

(22) Filed: Nov. 18, 2017

(65) Prior Publication Data

US 2018/0134968 A1  May 17, 2018

Related U.S. Application Data

(63) Continuation of application No. PCT/CN2015/089534, filed on Sep. 14, 2015.

(30) Foreign Application Priority Data

Aug. 3, 2015 (CN) .......................... 2015 1 0465319

(51) Int. Cl.
*B01J 37/04* (2006.01)
*B01J 37/08* (2006.01)
(Continued)

(52) U.S. Cl.
CPC ................. *C10G 3/50* (2013.01); *C10G 3/46* (2013.01); *C10G 3/48* (2013.01); *C10G 3/49* (2013.01);
(Continued)

(58) Field of Classification Search
USPC ......... 502/313–315, 324, 355; 423/625, 626, 423/628
See application file for complete search history.

(56) References Cited

U.S. PATENT DOCUMENTS 6,162,350 A * 12/2000 Soled .................... B01J 23/002
  208/113
6,733,657 B2 * 5/2004 Benazzi .................. B01J 21/12
  208/110
(Continued)

FOREIGN PATENT DOCUMENTS

CN    10 4255247    *  4/2015    ............. B01J 29/76

*Primary Examiner* — Patricia L. Hailey
(74) *Attorney, Agent, or Firm* — W&K IP; Jie Yang

(57) ABSTRACT

A hydrodeoxygenation catalyst takes self-made porous large-specific surface nano-alumina as a carrier, takes $Ni_x$-MoW, $Ni_x$CoW or $Ni_x$CoMo as an active component, and takes Mn as an assistant. Hydrothermal stability of the catalyst and dispersion of active components may be increased by enlarging a pore channel and a specific surface area of the carrier, thereby prolonging the life of the hydrodeoxygenation catalyst. A hydroisomerization catalyst takes multi-walled carbon nanotube composite hierarchical-pore-channel NiAPO-11 or NiSAPO-11 as a carrier and takes $Ni_x$MoLa, $Ni_x$CoLa or $Ni_x$WLa as an active component. Due to the adding of the carbon nanotubes, the pore channel of the carrier is enriched, and connection between the active components and the carrier is effectively enhanced, thereby prolonging the life of the catalyst on a basis of increasing selectivity of aviation kerosene component. Moreover, the (Continued)

biological aviation kerosene satisfying usage conditions is prepared by virtue of mild reaction conditions.

2 Claims, 7 Drawing Sheets

(51) Int. Cl.
*B01J 37/18* (2006.01)
*B01J 21/04* (2006.01)
*B01J 21/12* (2006.01)
*B01J 23/28* (2006.01)
*B01J 23/30* (2006.01)
*B01J 23/34* (2006.01)
*B01J 23/882* (2006.01)
*B01J 23/888* (2006.01)
*B01J 23/889* (2006.01)
*C10G 3/00* (2006.01)
*C10L 1/04* (2006.01)

(52) U.S. Cl.
CPC ........ *C10L 1/04* (2013.01); *C10G 2300/1014* (2013.01); *C10G 2300/202* (2013.01); *C10G 2400/08* (2013.01); *C10L 2200/043* (2013.01); *C10L 2270/04* (2013.01)

(56) References Cited

U.S. PATENT DOCUMENTS

2004/0230085 A1* 11/2004 Jakkula ............... C10G 3/45
585/240
2015/0190789 A1* 7/2015 Li ....................... B01J 37/03
208/216 R

* cited by examiner

CATALYST FOR PREPARING BIOLOGICAL AVIATION KEROSENE WITH CASTOR OIL, PREPARATION METHOD AND APPLICATION THEREOF

CROSS-REFERENCE TO RELATED APPLICATIONS

This application is a continuation of International Patent Application No. PCT/CN2015/089534 with a filing date of Sep. 14, 2015, designating the United States, now pending, and further claims priority to Chinese Patent Application No. 201510465319.6 with a filing date of Aug. 3, 2015. The content of the aforementioned applications, including any intervening amendments thereto, are incorporated herein by reference.

TECHNICAL FIELD

The present invention relates to a catalyst for preparing biological aviation kerosene with castor oil as raw material, a preparation method and an application of the catalyst, and particularly relates to a preparation method of a high-life hydrodeoxygenation and hydroisomerization catalyst for preparing the biological aviation kerosene with the castor oil and an application of the catalyst. A hydrodeoxygenation catalyst takes porous large-specific surface nano-alumina as a carrier, takes $Ni_xMoW$, $Ni_xCoW$ or $Ni_xCoMo$ as an active component, and takes Mn serves as an assistant. Hydrothermal stability of the catalyst and dispersion of the active component may be increased by enlarging a pore channel and a specific surface area of the carrier, thereby increasing the life of the hydrodeoxygenation catalyst. A hydroisomerization catalyst can also use multi-walled carbon nanotube composite hierarchical-pore-channel NiAPO-11 or NiSAPO-11 as a carrier and use $Ni_xMoLa$, $Ni_xCoLa$ or $Ni_xWLa$ as an active component. Due to the added multi-walled carbon nanotubes, the pore channel of the carrier is enriched, and connection between the active component and the carrier is effectively enhanced, thereby increasing the life of the catalyst on a basis of increasing selectivity of the aviation kerosene component. Moreover, the biological aviation kerosene satisfying usage conditions is prepared by virtue of mild reaction conditions.

BACKGROUND OF THE PRESENT INVENTION

In the Copenhagen Climate Conference in 2009, on year-on-year basis in 2005, the Chinese government promises that carbon emission will be reduced by 40-50% in 2020, which is a daunting task for us. Biological aviation kerosene is an oil product, prepared by using animal and vegetable oil as raw materials through a hydrogenated technology, having similar components as those of petroleum-based aviation kerosene. Main components are $C_8$-$C_{16}$ straight-chain and branch alkanes. Development of the biological aviation kerosene may reduce carbon emission. The biological aviation kerosene is renewable resource and may serve as an alternative fuel of petroleum. Therefore, the biological aviation kerosene has great significance. Castor serves as a plant with wide planting area and easiness in growth and is a crop suitable for oil production, and the prepared castor oil is not edible, i.e., the castor oil cannot be eaten by people. Therefore, the castor oil is an excellent renewable resource. The castor oil serves as a raw material, and high-yield aviation kerosene may be obtained by virtue of a hydrodeoxygenation process and a researched and developed catalyst, thereby alleviating energy crisis.

Stability of the catalyst is the most important in a hydrodeoxygenation reaction. Due to specific hydroxyl groups in the castor oil, a dehydration amount in the reaction is 2-3 times that of general grease, and thus the catalyst is required to have excellent hydrothermal stability. The large-specific surface nano-alumina designed in the present invention has excellent hydrothermal stability, and dispersion of active components may be increased due to a nano-structure of the alumina, thereby decreasing carbon deposit in the reaction and increasing the life of the catalyst. In a hydroisomerization reaction, the raw material is a product produced by utilizing the hydrodeoxygenation in the first step after dehydration, 90% of the components are $C_{17}$-$C_{15}$ alkanes, and 10% of the components are $C_5$-$C_6$ alkanes. Selectivity of carbon chains in the product is of vital importance, and the components of the aviation kerosene are required as $C_8$-$C_{16}$, so regulation of isomerizing and cracking degrees is very critical. Firstly, for a NiSAPO-11 carrier of a hierarchical pore channel, due to addition of Ni and a structure of the hierarchical pore channel, acid strength of a molecular sieve may be regulated in a controllable mode, thereby regulating the cracking degree of the isomerization reaction. Finally, the components of the aviation kerosene with the highest selectivity may be obtained. In addition, due to the adding of the carbon nano tubes, the strength of a catalyst carrier is well enhanced, and the catalyst carrier has active sites in the carbon nano tubes, so that a composite carrier has rich pore channels for isomerizing long-chain n-alkanes and decreasing the carbon deposit in the reaction, thereby increasing the life of the catalyst.

A preparation method for preparing hydrodeoxygenation and hydroisomerization catalysts of biological aviation kerosene with castor oil is disclosed in a patent CN201510038506.6. Titanium-modified and citric acid-modified MCM-41 are mainly used as a carrier of the hydrodeoxygenation catalyst. An active component selected by the hydroisomerization catalyst is Pt, Pd or Ni. A catalyst for preparing biodiesel through castor oil hydrogenation and a preparation method of the catalyst are disclosed in a patent CN201410020108.7. The carrier needs to be specially pretreated in the hydrodeoxygenation catalyst and the hydroisomerization catalyst. The carrier is pretreated by adopting an aqueous solution of acetic acid, and Zn serves as an assistant. A method for preparing biological aviation fuel by utilizing *Litsea cubeba* kernel oil is disclosed in a patent CN102719317A. and comprises the steps: carrying out a hydrodeoxygenation reaction and a hydroisomerization reaction on refined *Litsea cubeba* oil, distilling the obtained product to take a fraction between 150° C. and 280° C., and refining the fraction by using a fiber liquid membrane-composite adsorption combined apparatus and a dielectric field refining apparatus, thereby obtaining the biological aviation kerosene satisfying the usage conditions.

The above disclosed patents focus on hydrodeoxygenation activity and yield of the oil product, while the present invention prolongs the life of the catalyst by a designed catalyst with a specific structure while increasing activity and yield, so that the modified catalyst is more favorable for industrial production.

SUMMARY OF PRESENT INVENTION

An objective of the present invention is to propose a catalyst for preparing biological aviation kerosene with castor oil as well as a preparation method and an application thereof, and particularly relates to a preparation method of preparing a high-life hydrodeoxygenation and hydroisomerization catalyst of the biological aviation kerosene with castor oil and an application thereof. The present invention provides preparation methods of a hydrodeoxygenation catalyst taking large-specific surface nano-alumina as a carrier and a hierarchical pore channel molecular sieve composite carbon nanotube supported hydroisomerization catalyst and usage conditions. The catalyst in the present invention can reach extremely long life and obtain high-yield biological aviation kerosene to serve as a technical reserve for replacing petroleum-based fuel.

The hydrodeoxygenation catalyst for preparing the biological aviation kerosene with castor oil provided in the present invention takes porous large-specific surface nano-alumina as a carrier, takes $Ni_xMoW$, $Ni_xCoW$ or $Ni_xCoMo$ as an active component, and takes Mn as an assistant. Mass of the active component accounts for 10-30% of total mass of the catalyst, wherein x is an atomic ratio and ranges from 2 to 20, and mass of the component Mn accounts for 1-5% of the total mass of the catalyst.

A specific surface area of the porous large-specific surface nano-alumina carrier is 500-800 $m^2/g$. Seen from an adsorption-desorption curve, the carrier simultaneously has microporous and mesoporous curve types, so the carrier has a hierarchical pore channel structure, as shown in FIG. 4 in detail.

A specific preparation method comprises the following steps:

1) stirring and refluxing aluminum isopropoxide and cetyl trimethyl ammonium bromide in a nitric acid solution; adding sodium silicate for refluxing, stirring and reacting, and aging; adding ethyl orthosilicate for refluxing, adding sodium hydroxide into the obtained mixed solution, refluxing, separating solid products, and drying; and calcining in a nitrogen atmosphere, thereby obtaining a large-specific surface nano-alumina carrier;

2) fully mixing the obtained alumina, reacting with an aqueous solution of manganese chloride, performing suction filtration, drying a product, and calcining in the nitrogen atmosphere;

3) adding the calcined product into an aqueous solution of an active component soluble salt and fully mixing and reacting, standing, separating solid products, and drying; and 4) calcining in the nitrogen atmosphere, and reducing solid powder at hydrogen flow velocity, thereby obtaining the hydrodeoxygenation catalyst for preparing the biological aviation kerosene with castor oil.

A specific preparation method for preparing the hydrodeoxygenation catalyst of the biological aviation kerosene with castor oil provided in the present invention comprises the following steps:

1) adding aluminum isopropoxide into 0.05 mol/L of nitric acid, refluxing and stirring at 80° C. for 3-5 hours, adding cetyl trimethyl ammonium bromide, and continuously stirring for 2-3 hours to obtain a mixed solution;

2) adding sodium silicate into the mixed solution, refluxing and stirring at 80° C. for 3-5 hours, and aging at a room temperature for 2 hours to obtain a mixed solution;

3) adding ethyl orthosilicate into the mixed solution, refluxing and stirring at 80° C. for 3-5 hours, and aging at the room temperature for 2 hours;

4) adding 1-5% of sodium hydroxide into the mixed solution obtained in the step 3), refluxing and stirring at 80° C. for 3-5 hours, performing centrifugal separation, drying the obtained solid precipitate at 100° C., and calcining in a nitrogen atmosphere at 500-600° C. for 4-6 hours, thereby obtaining the large-specific surface nano-alumina carrier, wherein a molar ratio of various raw materials in the steps 1) to 3) is: the aluminum isopropoxide to the 0.05 mol/L of nitric acid to the cetyl trimethyl ammonium bromide to the sodium silicate to the ethyl orthosilicate is (50-120):1:(0.5-5):(0.5-5):(0.5-5);

5) adding an assistant manganese chloride into an aqueous solution in an amount of three times that of mass of the carrier according to a ratio for stirring for 3 hours under room-temperature stirring conditions, adding the large-specific surface nano-alumina carrier for stirring 3-5 hours to obtain a mixed solution, performing suction filtration on the mixed solution, drying a solid product at 100° C. for 8 hours, and calcining in the nitrogen atmosphere at 500-600° C. for 4-6 hours to obtain solid powder; and 6) sequentially adding active component soluble salts into the aqueous solution of an amount of three times of mass of the carrier according to a ratio for stirring for 3 hours under the room-temperature stirring conditions, adding the solid powder in the step 5) for stirring 3-5 hours to obtain a mixed solution, standing for 10 hours, drying the standing mixed solution at 100° C. for 8 hours, calcining in the nitrogen atmosphere at 500-600° C. for 4-6 hours, and reducing the obtained solid powder at 550-600° C. at hydrogen flow velocity of 200-300 mL/min for at least 3 hours, thereby obtaining the hydrodeoxygenation catalyst for preparing the biological aviation kerosene with castor oil.

The active component soluble salt refers to nickel nitrate, cobalt nitrate, ammonium metatungstate or ammonium molybdate.

The hydrodeoxygenation catalyst for preparing the biological aviation kerosene with castor oil provided in the present invention takes hierarchical-pore-channel multi-walled carbon nanotube composite hierarchical-pore-channel NiAPO-11 or NiSAPO-11 as a carrier and takes $Ni_xMoLa$, $Ni_xCoLa$ or $Ni_xWLa$ as an active component, wherein x is an atomic ratio and ranges from 2 to 20, and mass of the active component accounts for 5-30% of total mass of the catalyst.

The preparation method comprises the following steps: fully stirring and mixing an N,N-dimethylformamide solution of active component soluble salt, i.e., nickel acetylacetonate, cobalt nitrate, ammonium metatungstate, ammonium molybdate, or lanthanum nitrate with a carrier of hierarchical-pore-channel NiAPO-11, multi-walled carbon nanotube composite hierarchical-pore-channel NiAPO-11, hierarchical-pore-channel NiSAPO-11 or multi-walled carbon nanotube composite hierarchical-pore-channel NiSAPO-11 according to a ratio, standing, separating, drying a solid product, calcining in an air atmosphere, and reducing in hydrogen.

A specific preparation method for preparing the hydroisomerization catalyst of the biological aviation kerosene with castor oil provided in the present invention comprises the following steps:

fully stirring an N,N-dimethylformamide solution of active component soluble salt, i.e., nickel acetylacetonate, cobalt nitrate, ammonium metatungstate, ammonium molybdate, or lanthanum nitrate with a carrier of hierarchical-pore-channel NiAPO-11, multi-walled carbon nanotube composite hierarchical-pore-channel NiAPO-11, hierarchical-pore-channel NiSAPO-11 or multi-walled carbon nanotube composite hierarchical-pore-channel NiSAPO-11 for at least 12 hours according to a ratio, standing for 10 hours, separating, drying the solid product at 100° C., calcining the obtained solid powder at 550-600° C. in an air atmosphere for at least 4 hours, and reducing at 550-600° C. at hydrogen flow velocity of 200-300 mL/min for at least 3 hours, thereby obtaining the hydroisomerization catalyst for preparing the biological aviation kerosene with castor oil.

A preparation method of a hierarchical-pore-channel NiAPO-11 carrier comprises the following steps: respectively mixing deionized water, nickel acetylacetonate, phosphoric acid and pseudo-boehmite together according to a molar ratio of (50-100):(0.01-1):1:1, and stirring for 3 hours, wherein the nickel acetylacetonate, silica sol, the phosphoric acid and the pseudo-boehmite are respectively counted based on nickel oxide, silica, phosphorus pentoxide and aluminum oxide; adding starch to carry out a hydrolysis reaction, and stirring for at least 5 hours, wherein a molar ratio of the starch to the phosphoric acid is 0.03-0.3; adding a template agent and stirring for 3 hours, wherein the template agent is a mixture of di-n-propylamine and diisopropylamine with a molar ratio is (0.5-1.5):1, and a molar ratio of the template agent to the phosphoric acid is (0.5-1.2):1; and adding the mixture into a high-pressure crystallization kettle with a polytetrafluoro lining, sealing, crystallizing at 150-200° C. for 20-48 hours, taking out the mixture, washing a solid product, drying, and calcining in a muffle furnace at 600° C. for 12 hours, thereby obtaining the hierarchical-pore-channel NiAPO-11 carrier.

A preparation method of a multi-walled carbon nanotube composite hierarchical-pore-channel NiAPO-11 composite carrier comprises the following steps: dissolving a 1-5% of silane coupling agent in an N,N-dimethylformamide solvent with a water absorption rate which is 3 times that of the NiAPO-11; adding 1-5% of multi-walled carbon nanotubes for continuously refluxing and stirring for 1-3 hours, adding a NiAPO-11 carrier to reflux and stir at 100-120 t for 1-3 hours, performing suction filtration on the obtained mixed solution, drying at 120° for 5 hours, and calcining the obtained solid powder in a muffle furnace at 500° C. for 5-10 hours, thereby obtaining the multi-walled carbon nanotube composite hierarchical-pore-channel NiAPO-11 composite carrier.

A preparation method of a hierarchical-pore-channel NiSAPO-11 carrier comprises the following steps: respectively mixing deionized water, nickel acetylacetonate, silica sol, phosphoric acid and pseudo-boehmite together according to a molar ratio of (50-100):(0.01-1):(0.1-1):1:1, and stirring for 3 hours, wherein the nickel acetylacetonate, the silica sol, the phosphoric acid and the pseudo-boehmite are respectively counted based on nickel oxide, silica, phosphorus pentoxide and aluminum oxide; adding starch to carry out a hydrolysis reaction, and stirring for 5 hours, wherein a molar ratio of the starch to the phosphoric acid is 0.03-0.3; adding a template agent and stirring for 3 hours, wherein the template agent is a mixture of di-n-propylamine and diisopropylamine with a molar ratio is (0.5-1.5):1, and a molar ratio of the template agent to the phosphoric acid is (0.5-1.2):1; and adding the mixture into a high-pressure crystallization kettle with a polytetrafluoro lining, sealing, crystallizing at 150-200° C. for 20-48 hours, taking out the mixture, washing a solid product, drying, and calcining in a muffle furnace at 600° C. for 12 hours, thereby obtaining the hierarchical-pore-channel NiSAPO-11 carrier.

A preparation method of a multi-walled carbon nanotube composite hierarchical-pore-channel NiSAPO-11 composite carrier comprises the following steps: dissolving a 1-5% (mass) of silane coupling agent in an N,N-dimethylformamide solvent with a water absorption rate which is 3 times of NiSAPO-11; adding 1-5% (mass) of multi-walled carbon nanotubes for continuously refluxing and stirring for 1-3 hours, adding a NiSAPO-11 carrier to reflux and stir at 100-120° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiSAPO-11 composite carrier.

The multi-walled carbon nanotube has a diameter of 20 nm, a length of 10-30 μm and a specific surface area greater than 500.

A specific using method of the catalyst for preparing the biological aviation kerosene with castor oil provided in the present invention comprises the following steps:

1) pretreatment of the catalyst: forming a catalyst of a required amount, filling the catalyst in a fixed bed reactor, heating to 300-450° C. under nitrogen purging with volume space velocity of 500-2000h$^{-1}$, changing into hydrogen with the same volume space velocity, maintaining a temperature of 300-450° C. for at least 3 hours, and regulating a temperature of the reactor to a temperature of a hydroisomerization and cracking reaction;

2) hydrodeoxygenation reaction: taking the castor oil as raw oil of the hydrodeoxygenation reaction, and regulating a pressure of a reaction system to 2-6 MPa, wherein a reaction temperature is 250-400° C., a hydrogen-oil ratio is 500-2000, and volume space velocity of the fed raw oil is 1-6 h$^{-1}$; and collecting a liquid product obtained in the reaction every 2 hours, and analyzing; and 3) hydroisomerization reaction: taking an anhydrous liquid product obtained by the hydrodeoxygenation of the castor oil as a raw material (including: $C_{17}$-$C_{18}$ with a mass fraction of 90%, and $C_5$-$C_{16}$ with a mass fraction of 10%), regulating a pressure of a reaction system to 2-6 MPa, wherein a reaction temperature is 250-400° C., a hydrogen-oil ratio is 500-2000, and volume space velocity of the fed raw oil is 1-6 h$^{-1}$; and collecting a liquid product obtained in the reaction every 2 hours.

A basic composition of the castor oil is as follows: castor oil acid triglyceride with a mass fraction of 90%, palmitin with a mass fraction of 5% and stearin with a mass fraction of 5%.

A basic composition of the anhydrous liquid product obtained by the hydrodeoxygenation of the castor oil is as follows: $C_{17}$-$C_{18}$ with a mass fraction of 90% and $C_5$-$C_{16}$ with a mass fraction of 10%.

Compared with an existing catalyst and a preparation method thereof, the catalyst for preparing the biological aviation kerosene with castor oil provided in the present invention has the following obvious substantive features:

(1) for the hydrodeoxygenation reaction of the castor oil, life of a large-specific surface nano-alumina supported trimetallic catalyst greatly increases life and stability of the catalyst. Particularly, porous large-specific surface nano-alumina serves as a carrier, $Ni_x$MoW, $Ni_x$CoW or $Ni_x$CoMo serves as an active component, and Mn serves as an assistant. Hydrothermal stability of the catalyst and dispersion of the active components may be increased by enlarging a pore channel and a specific surface area of the carrier, thereby prolonging the life of the hydrodeoxygenation catalyst; and (2) the hydroisomerization catalyst takes multi-walled carbon nanotube composite hierarchical-pore-channel NiAPO-11 or NiSAPO-11 as a carrier and takes $Ni_x$MoLa, $Ni_x$CoLa or $Ni_x$WLa as an active component. Due to the added multi-walled carbon nanotubes, the pore channel of the carrier is enriched, and connection between the active component and the carrier is effectively enhanced, thereby increasing the life and stability of the catalyst on a basis of increasing the selectivity of the aviation kerosene component. Moreover, the biological aviation kerosene satisfying usage conditions is prepared by virtue of mild reaction conditions.

DETAILED DESCRIPTION OF PREFERRED EMBODIMENTS

Figure 1:
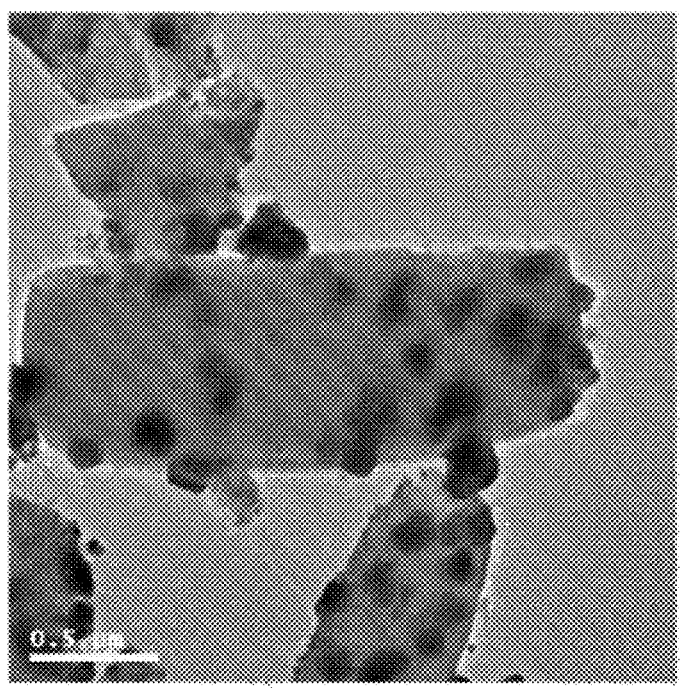
FIG. 1 is a transmission electron microscope diagram of synthesized carbon nanotube supported hierarchical-pore-channel NiMoLa/NiSAPO-11.
Figure 2:
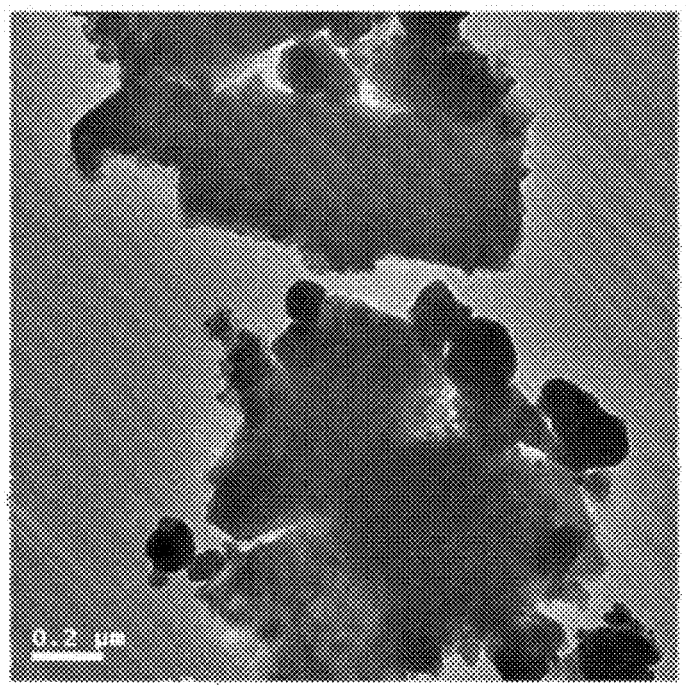
FIG. 2 is a transmission electron microscope diagram of synthesized carbon nanotube supported hierarchical-pore-channel NiWLa/NiSAPO-11.
Figure 3:
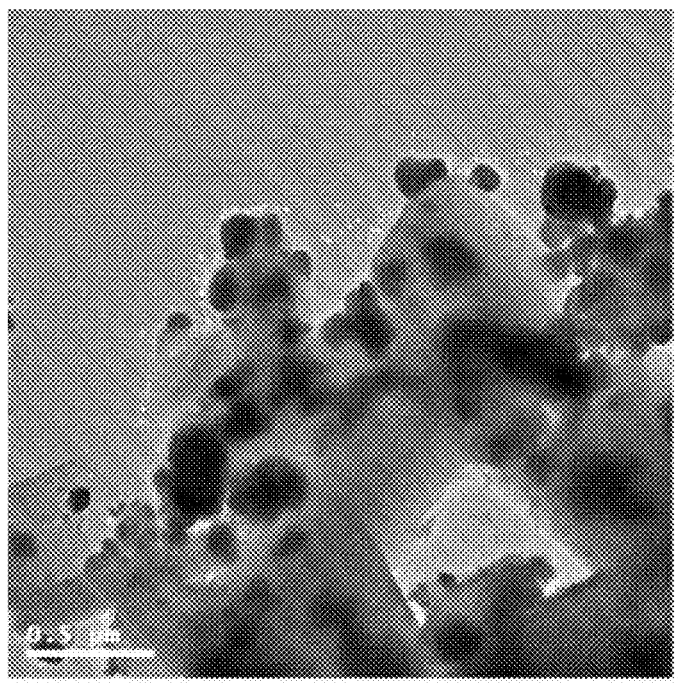
FIG. 3 is a transmission electron microscope diagram of synthesized carbon nanotube supported hierarchical-pore-channel NiCoLa/NiAPO-11.
Figure 4:
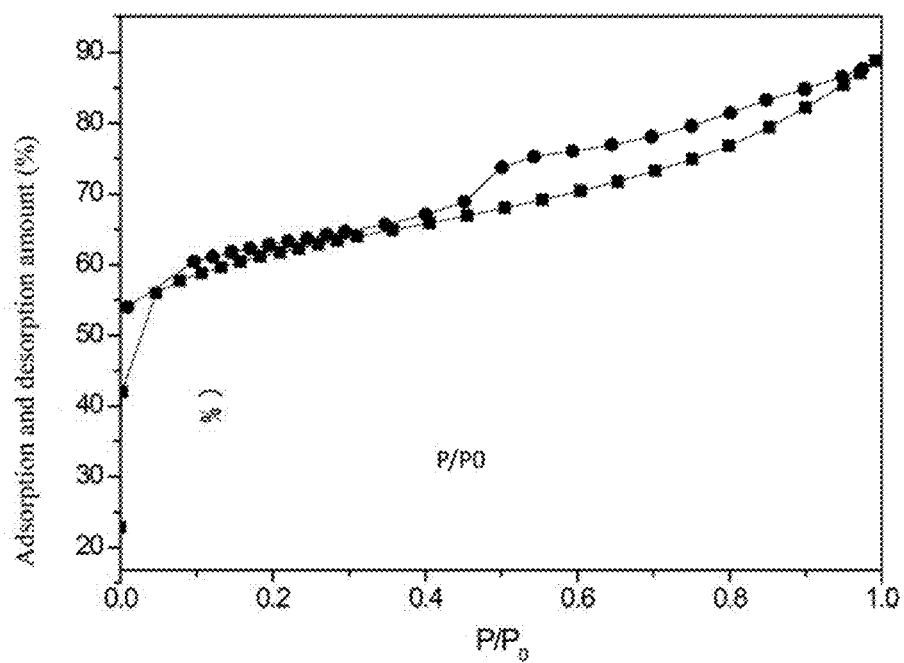
FIG. 4 is a nitrogen adsorption-desorption curve of a catalyst NiMoW/$Al_2O_3$.
Figure 5:
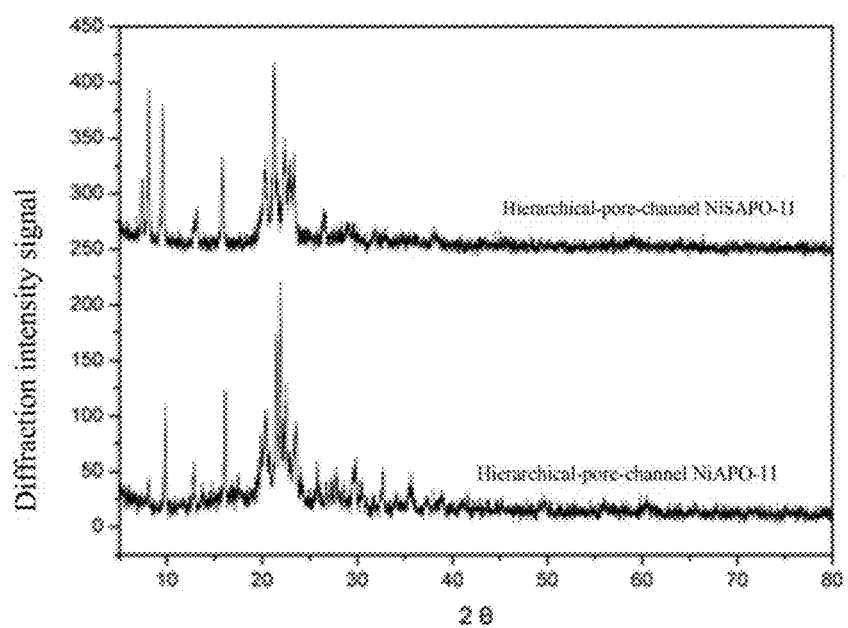
FIG. 5 is XRD diagram of hierarchical-pore-channel NiAPO-11 and NiSAPO-11.
Figure 6:
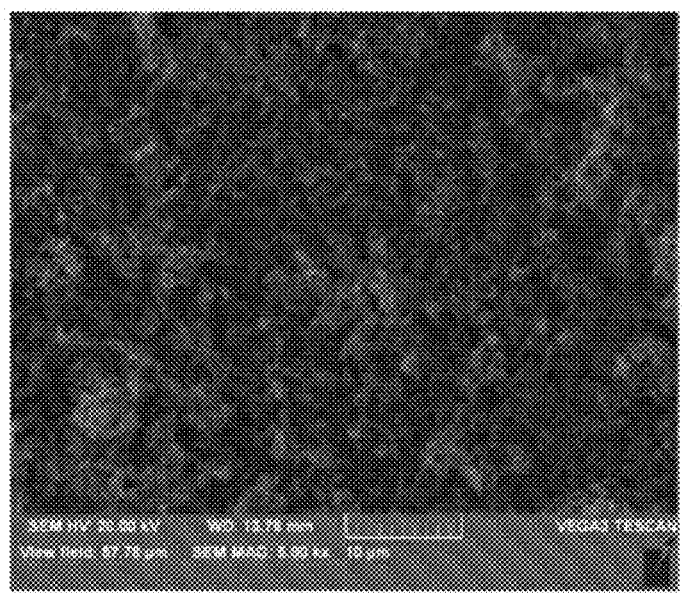
FIG. 6 is a scanning electron microscope diagram of NiMoW/$Al_2O_3$.
Figure 7:
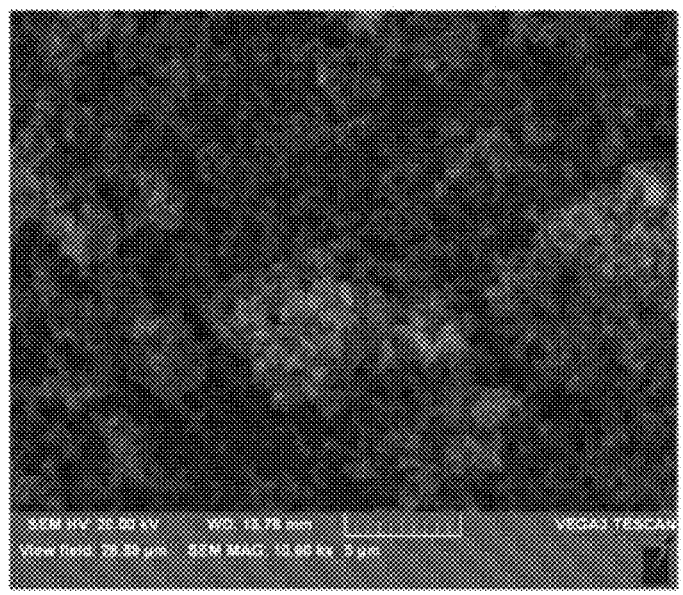
FIG. 7 is a scanning electron microscope diagram of large-specific surface nano-alumina.

The present invention is described below in detail with reference to specific embodiments, while the illustrated embodiments do not make any limitation to a scope of technical solutions required to be protected by claims. Meanwhile, it is particularly indicated that experimental methods without marked specific conditions in embodiments are generally implemented according to routine conditions and conditions in a manual or according to conditions suggested by a manufacturer. The used general equipment, materials, reagents and the like may be obtained commercially.

Embodiment 1

Preparation of a hydrodeoxygenation catalyst comprises the following steps:

adding 16.2 g of aluminum isopropoxide into 32 mL of 0.05 mol/L of nitric acid, refluxing and stirring at 80° C. for 3-5 hours, adding 1.2 g of cetyl trimethyl ammonium bromide, and continuously stirring for 2-3 hours to obtain a mixed solution A; adding 0.27 g of sodium silicate into the mixed solution A, refluxing and stirring at 80° C. for 3-5 hours, and aging at a room temperature for 2 hours to obtain a mixed solution B; adding 0.66 g of ethyl orthosilicate into the mixed solution B, refluxing and stirring at 80° C. for 3-5 hours, and aging at the room temperature for 2 hours to obtain a mixed solution C; adding 1-5% of sodium hydroxide into the mixed solution C, refluxing and stirring at 80° C. for 3-5 hours, performing centrifugal separation, drying the obtained solid precipitate at 100° C. for 8 hours, and calcining in a nitrogen atmosphere at 500-600° C. for 4-6 hours to obtain a large-specific surface nano-alumina carrier; adding 2.3 g of manganese chloride into 24 g of distilled water under room-temperature stirring conditions, stirring for 3 hours and fully dissolving, adding 7.5 g of the large-specific surface nano-alumina carrier, stirring for 3 hours to obtain a mixed solution, performing suction filtration on the mixed solution, drying the mixed solution at 100° C. for 8 hours, and calcining in the nitrogen atmosphere at 500-600° C. for 4-6 hours to obtain solid powder, and recording the solid powder as D; adding 24 g of distilled water into 10 g of nickel nitrate, 0.45 g of ammonium molybdate and 0.32 g of ammonium metatungstate to stir for 3 hours under room-temperature stirring conditions, fully dissolving, adding the solid powder D, stirring for 3-5 hours to obtain a mixed solution, and standing the mixed solution for 10 hours; drying the mixed solution at 100° C. for 8 hours, calcining the obtained solid powder in the nitrogen atmosphere at 500-600° C. for 4-6 hours, and reducing the obtained solid powder at 550-600° C. at hydrogen flow velocity of 200-300 mL/min for at least 3 hours, thereby obtaining the hydrodeoxygenation catalyst, i.e., cat1, for preparing biological aviation kerosene with castor oil.

Embodiment 2

Preparation of a hydrodeoxygenation catalyst comprises the following steps:

adding 16.2 g of aluminum isopropoxide into 32 mL of 0.05 mol/L of nitric acid, refluxing and stirring at 80° C. for 3-5 hours, adding 1.2 g of cetyl trimethyl ammonium bromide, and continuously stirring for 2-3 hours to obtain a mixed solution A; adding 0.27 g of sodium silicate into the mixed solution A, refluxing and stirring at 80° C. for 3-5 hours, and aging at a room temperature for 2 hours to obtain a mixed solution B; adding 0.66 g of ethyl orthosilicate into the mixed solution B, refluxing and stirring at 80° C. for 3-5 hours, and aging at the room temperature for 2 hours to obtain a mixed solution C; adding 1-5% of sodium hydroxide into the mixed solution C, refluxing and stirring at 80° C. for 3-5 hours, performing centrifugal separation, drying the obtained solid precipitate at 100° C. for 8 hours, calcining in a nitrogen atmosphere at 500-600° C. for 4-6 hours to obtain a large-specific surface nano-alumina carrier; adding 2.3 g of manganese chloride into 24 g of distilled water under room-temperature stirring conditions, stirring for 3 hours and fully dissolving, adding 7.5 g of the large-specific surface nano-alumina carrier, stirring for 3 hours to obtain a mixed solution, performing suction filtration on the mixed solution, drying the mixed solution at 100° C. for 8 hours, calcining in the nitrogen atmosphere at 500-600° C. for 4-6 hours to obtain solid powder, and recording the solid powder as D; adding 24 g of distilled water into 10 g of nickel nitrate, 0.25 g of cobalt nitrate and 0.32 g of ammonium metatungstate under room-temperature stirring conditions to stir for 3 hours, fully dissolving, adding the solid powder D, stirring for 3-5 hours to obtain a mixed solution, and standing the mixed solution for 10 hours; drying the mixed solution at 100° C. for 8 hours, calcining the obtained solid powder in the nitrogen atmosphere at 500-600° C. for 4-6 hours, and reducing the obtained solid powder at 550-600° C. at hydrogen flow velocity of 200-300 mL/min for at least 3 hours, thereby obtaining the hydrodeoxygenation catalyst, i.e., cat2, for preparing biological aviation kerosene with castor oil.

Embodiment 3

Preparation of a hydrodeoxygenation catalyst comprises the following steps:

adding 16.2 g of aluminum isopropoxide into 32 mL of 0.05 mol/L of nitric acid, refluxing and stirring at 80° C. for 3-5 hours, adding 1.2 g of cetyl trimethyl ammonium bromide, and continuously stirring for 2-3 hours to obtain a mixed solution A; adding 0.27 g of sodium silicate into the mixed solution A, refluxing and stirring at 80° C. for 3-5 hours, and aging at a room temperature for 2 hours to obtain a mixed solution B; adding 0.66 g of ethyl orthosilicate into the mixed solution B, refluxing and stirring at 80° C. for 3-5 hours, and aging at the room temperature for 2 hours to obtain a mixed solution C; adding 1-5% of sodium hydroxide into the mixed solution C, refluxing and stirring at 80° C. for 3-5 hours, performing centrifugal separation, drying the obtained solid precipitate at 100° C. for 8 hours, calcining in a nitrogen atmosphere at 500-600° C. for 4-6 hours to obtain a large-specific surface nano-alumina carrier; adding 2.3 g of manganese chloride into 24 g of distilled water under room-temperature stirring conditions, stirring for 3 hours and fully dissolving, adding 7.5 g of the large-specific surface nano-alumina carrier, stirring for 3 hours to obtain a mixed solution, performing suction filtration on the mixed solution, drying the mixed solution at 100° C. for 8 hours, calcining in the nitrogen atmosphere at 500-600° C. for 4-6 hours to obtain solid powder, and recording the solid powder as D; adding 24 g of distilled water into 10 g of nickel nitrate, 0.35 g of cobalt nitrate and 0.45 g of ammonium molybdate under room-temperature stirring conditions to stir for 3 hours, fully dissolving, adding the solid powder D, stirring for 3-5 hours to obtain a mixed solution, and standing the mixed solution for 10 hours; drying the mixed solution at 100° C. for 8 hours, calcining the obtained solid powder in the nitrogen atmosphere at 500-600° C. for 4-6 hours, and reducing the obtained solid powder at 550-600° C. at hydrogen flow velocity of 200-300 mL/min for at least 3 hours, thereby obtaining the hydrodeoxygenation catalyst, i.e., cat3, for preparing biological aviation kerosene with castor oil.

Embodiment 4

Preparation of a hydroisomerization catalyst comprises the following steps:

(1) a preparation method of multi-walled carbon nanotube composite hierarchical-pore-channel NiAPO-11 comprises the following steps: respectively mixing 15 g of deionized water, 0.36 g of nickel acetylacetonate, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 200° C. for 24 hours, taking out the mixture, washing a solid product, drying at 120° C. for 12 hours, calcining in a muffle furnace at 600° C. for 12 hours to obtain the hierarchical-pore-channel NiAPO-11, i.e., E; dissolving 1 g of silane coupling agent in a 30 g of DMF solvent; adding 1 g of multi-walled carbon nanotube for continuously refluxing and stirring for 1-3 hours, adding the E to reflux and stir at 100-120° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiAPO-11 composite carrier, i.e., F, and (2) uploading active components under 30-50° C. stirring conditions, dissolving 1.41 g of nickel acetylacetonate, 1 g of lanthanum nitrate and 0.47 g of ammonium metatungstate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat4, for preparing the biological aviation kerosene with castor oil.

Embodiment 5

Preparation of a hydroisomerization catalyst comprises the following steps:

(1) a preparation method of multi-walled carbon nanotube composite hierarchical-pore-channel NiAPO-11 comprises the following steps: respectively mixing 15 g of deionized water, 0.36 g of nickel acetylacetonate, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 200° C. for 24 hours, taking out the mixture, washing a solid product, drying at 1201° C. for 12 hours, calcining in a muffle furnace at 600° C. for 12 hours to obtain the hierarchical-pore-channel NiAPO-11, i.e., E; dissolving 1 g of silane coupling agent in a 30 g of DMF solvent; adding 1 g of multi-walled carbon nanotube (with a diameter of 15 nm and a specific surface area of 500 m$^2$/g) for continuously refluxing and stirring for 1-3 hours, adding the E to reflux and stir at 100-1201° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiAPO-11 composite carrier, i.e., F; and (2) uploading active components under 30-50° C. stirring conditions, dissolving 1.41 g of nickel acetylacetonate, 1 g of lanthanum nitrate and 0.45 g of ammonium molybdate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat5, for preparing the biological aviation kerosene with castor oil.

Embodiment 6

Preparation of a hydroisomerization catalyst comprises the following steps:

(1) a preparation method of multi-walled carbon nanotube composite hierarchical-pore-channel NiAPO-11 comprises the following steps: respectively mixing 15 g of deionized water, 0.36 g of nickel acetylacetonate, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 2000° C. for 24 hours, taking out the mixture, washing a solid product, drying at 120° C. for 12 hours, calcining in a muffle furnace at 600° C. for 12 hours to obtain the hierarchical-pore-channel NiAPO-11, i.e., E; dissolving 1 g of a silane coupling agent in 30 g of DMF solvent; adding 1 g of multi-walled carbon nanotube for continuously refluxing and stirring for 1-3 hours, adding the E to reflux and stir at 100-120° C. for 1-3 hours, performing suction filtration on the obtained mixed solution, drying at 120° C. for 5 hours, and calcining the obtained solid powder in a muffle furnace at 5001° C. for 5-10 hours, thereby obtaining the multi-walled carbon nanotube composite hierarchical-pore-channel NiAPO-11 composite carrier, i.e., F; and (2) uploading active components under 30-50° C. stirring conditions, dissolving 1.41 g of nickel acetylacetonate, 1 g of lanthanum nitrate and 0.29 g of cobalt nitrate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat6, for preparing the biological aviation kerosene with castor oil.

Embodiment 7

Preparation of a hydroisomerization catalyst comprises the following steps:

(1) a preparation method of multi-walled carbon nanotube composite hierarchical-pore-channel NiSAPO-11 comprises the following steps: respectively mixing 15 g of deionized water, 0.36 g of nickel acetylacetonate, 0.36 g of silica sol, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 2000° C. for 24 hours, taking out the mixture, washing a solid product, drying at 120° C. for 12 hours, calcining in a muffle furnace at 600° C. for 12 hours to obtain the hierarchical-pore-channel NiAPO-11, i.e., E; dissolving 1 g of silane coupling agent in 30 g of DMF solvent; adding 1 g of multi-walled carbon nanotube for continuously refluxing and stirring for 1-3 hours, adding the E to reflux and stir at 100-120° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiSAPO-11 composite carrier, i.e., F; and (2) uploading active components under 30-50° C. stirring conditions, dissolving 1.41 g of nickel acetylacetonate, 1 g of lanthanum nitrate and 0.47 g of ammonium metatungstate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat7, for preparing the biological aviation kerosene with castor oil.

Embodiment 8

Preparation of a hydroisomerization catalyst comprises the following steps:

(1) a preparation method of multi-walled carbon nanotube composite hierarchical-pore-channel NiSAPO-11 comprises the following steps: respectively mixing 15 g of deionized water, 0.36 g of nickel acetylacetonate, 0.36 g of silica sol, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 2000° C. for 24 hours, taking out the mixture, washing a solid product, drying at 120° C. for 12 hours, calcining in a muffle furnace at 600° C. for 12 hours to obtain the hierarchical-pore-channel NiAPO-11, i.e., E; dissolving 1 g of silane coupling agent in 30 g of DMF solvent; adding 1 g of multi-walled carbon nanotube for continuously refluxing and stirring for 1-3 hours, adding the E to reflux and stir at 100-120° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiSAPO-11 composite carrier, i.e., F; and (2) uploading active components under 30-50° C. stirring conditions, dissolving 1.41 g of nickel acetylacetonate, 1 g of lanthanum nitrate and 0.45 g of ammonium molybdate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat8, for preparing the biological aviation kerosene with castor oil.

Embodiment 9

Preparation of a hydroisomerization catalyst comprises the following steps:

(1) a preparation method of multi-walled carbon nanotube composite hierarchical-pore-channel NiSAPO-11 comprises the following steps: respectively mixing 15 g of deionized water, 0.36 g of nickel acetylacetonate, 0.36 g of silica sol, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 200° C. for 24 hours, taking out the mixture, washing a solid product, drying at 120° C. for 12 hours, calcining in a muffle furnace at 600° C. for 12 hours to obtain the hierarchical-pore-channel NiAPO-11, i.e., E; dissolving 1 g of a silane coupling agent in 30 g of DMF solvent; adding 1 g of multi-walled carbon nanotube for continuously refluxing and stirring for 1-3 hours, adding the E to reflux and stir at 100-120° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiSAPO-11 composite carrier, i.e., F; and (2) uploading active components under 30-50° C. stirring conditions, dissolving 1.41 g of nickel acetylacetonate, 1 g of lanthanum nitrate and 0.29 g of cobalt nitrate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat9, for preparing the biological aviation kerosene with castor oil.

Embodiment 10

A using method of a hydrodeoxygenation catalyst comprises the following steps:

1) pretreatment of the catalyst: forming a catalyst in embodiment 1, filling the catalyst in a fixed bed reactor, heating to 400° C. under nitrogen purging with volume space velocity of 500 h$^{-1}$, changing into hydrogen with the same volume space velocity, maintaining a temperature of 400° C. for at least 3 hours, and regulating a temperature of the reactor to 300° C.; and 2) hydrodeoxygenation reaction: taking the castor oil (analytically pure, purity of 99%, and purchased from Tianjin Guangfu Reagent Co., Ltd.) as raw oil of the hydrodeoxygenation reaction, and regulating a pressure of a reaction system to 3 MPa, wherein a reaction temperature is 300° C., a hydrogen-oil ratio is 800, and volume space velocity of the fed raw oil is 2 h$^{-1}$; and collecting a liquid product obtained in the reaction every 2 hours. A method for analyzing the product comprises the following steps: testing by gas chromatography-mass spectrometry, adopting an Agilent gas chromatograph and mass spectrometer, and dividing the temperature of an injection oven into three phases; a phase of maintaining 50° C. for 10 minutes, a phase of heating to 100° C. at a speed of 30° C./min and maintaining for 10 minutes and a phase of heating to 200° C. at a speed of 30° C./min and maintaining for 10 minutes.

Embodiment 11

A using method of a hydrolsomerization catalyst comprises the following steps:

1) pretreatment of the catalyst: forming a catalyst in embodiment 6, filling the catalyst in a fixed bed reactor, heating to 400° C. under nitrogen purging with volume space velocity of 500 h$^{-1}$, changing into hydrogen with the same volume space velocity, maintaining a temperature of 400° C. for at least 3 hours, and regulating a temperature of the reactor to 300° C.; and 2) hydroisomerization reaction: taking a dehydration product obtained by hydrodeoxygenation (composition: 90% of $C_{17}$-$C_{18}$ and 10% of $C_5$-$C_{16}$) as a raw material (a preparation method: the hydrodeoxygenation catalyst in embodiments 1-3 is used as a catalyst, conditions in embodiment 10 are used as the conditions, and a method in embodiment 10 is used as an analysis method), and regulating a pressure of a reaction system to 3 MPa, wherein a reaction temperature is 320° C. a hydrogen-oil ratio is 800, and volume space velocity of the fed raw oil is 2 h$^{-1}$; and collecting a liquid product obtained in the reaction every 2 hours.

Embodiment 12

A preparation method of an anhydrous liquid product through hydrodeoxygenation of castor oil comprises the following steps:

pouring a castor oil hydrodeoxygenation product in embodiment 10 into 500 ml of separating funnel, standing for 5 hours, and separating a lower water layer to obtain an upper transparent solution layer, i.e., the anhydrous hydrodeoxygenation product, wherein the composition of the product comprises 90% of $C_{17}$-$C_{18}$ and 10% of $C_5$-$C_{16}$.

Reference Example 1

The purpose is to compare preparation steps of an ordinary alumina carrier and a hydrodeoxygenation catalyst without an assistant Mn with embodiment 1:

adding 24 g of distilled water into 10 g of nickel acetylacetonate, 0.45 g of ammonium molybdate and 0.32 g of ammonium metatungstate under room-temperature stirring conditions, stirring for 3 hours, and fully dissolving; adding ordinary alumina, stirring for 3-5 hours to obtain a mixed solution, standing the mixed solution for 10 hours, drying at 100° C. for 8 hours, calcining the obtained solid powder in a nitrogen atmosphere at 500-600° C. for 4-6 hours, and reducing the obtained solid powder at 550-600° C. at hydrogen flow velocity of 200-300 mL/min for at least 3 hours, thereby obtaining the hydrodeoxygenation catalyst, i.e., cat10, for preparing biological aviation kerosene with castor oil.

Reference Example 2

The purpose is to compare preparation steps of an ordinary nickel salt and a hydrodeoxygenation catalyst without an assistant Mn with embodiment 2:

adding 24 g of distilled water into 10 g of nickel nitrate, 0.45 g of ammonium molybdate and 0.32 g of ammonium metatungstate under room-temperature stirring conditions, stirring for 3 hours, and fully dissolving; adding self-made large-specific surface nano-alumina, stirring for 3-5 hours to obtain a mixed solution, standing the mixed solution for 10 hours, drying at 100° C. for 8 hours, calcining the obtained solid powder in a nitrogen atmosphere at 500-600° C. for 4-6 hours, and reducing the obtained solid powder at 550-600° C. at hydrogen flow velocity of 200-300 mL/min for at least 3 hours, thereby obtaining the hydrodeoxygenation catalyst, i.e., cat11, for preparing biological aviation kerosene with castor oil.

Reference Example 3

The purpose is to compare preparation steps of a microporous SAPO-11 catalyst with embodiment 4:

(1) a preparation method of SAPO-11: respectively mixing 15 g of deionized water, 0.36 g of silica sol, 2.07 g of phosphoric acid and 1.28 g of pseudo-boehmite together and uniformly stirring; adding 0.54 g of di-n-propylamine and 0.36 g of diisopropylamine and stirring for 3 hours again; and adding the mixture into a high-pressure crystallization kettle with a polytetrafluoro lining, sealing, crystallizing at 200° C. for 24 hours, taking out the mixture, washing a solid product, drying at 120° C. for 12 hours, and calcining in a muffle furnace at 600° C. for 12 hours, thereby obtaining the hierarchical-pore-channel SAPO-11, i.e., sample C; and (2) uploading of active components: dissolving 1.41 g of nickel acetylacetonate and 0.32 g of cobalt nitrate into 22 g of ethanol under 30-50° C. stirring conditions, and fully dissolving to obtain a solution T; adding 7.52 g of the sample C into the solution T, stirring for at least 12 hours, standing for 10 hours, drying the obtained solution in an air atmosphere at 1200° C., and calcining in the air atmosphere at 600° C. for at least 4 hours, thereby obtaining the hydroisomerization catalyst, i.e., cat12, for preparing biological aviation kerosene with castor oil.

Reference Example 4

The purpose is to compare preparation steps of a multi-walled-carbon-nanotube-free composite hierarchical-pore-channel NiAPO-11 catalyst with embodiment 5:

a preparation method of hierarchical-pore-channel NiAPO-11: respectively mixing 15 g of deionized water, 0.36 g of nickel acetylacetonate, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 200° C. for 24 hours, taking out the mixture, washing a solid product, drying at 120° C. for 12 hours, and calcining in a muffle furnace at 600° C. for 12 hours to obtain the hierarchical-pore-channel NiAPO-11, i.e., E; and uploading active components under 30-50° C. stirring conditions, dissolving 1.41 g of nickel acetylacetonate, 1 g of lanthanum nitrate and 0.45 g of ammonium molybdate into 30 g of N,N-dimethylformamide, and fully dissolving to obtain a solution T; adding the carrier E to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat13, for preparing the biological aviation kerosene with castor oil.

Reference Example 5

The purpose is to compare preparation steps of a multi-walled-carbon-nanotube-free composite hierarchical-pore-channel NiSAPO-11 catalyst with embodiment 7:

(1) a preparation method of multi-walled carbon nanotube composite hierarchical-pore-channel NiSAPO-11 comprises the following steps: respectively mixing 15 g of deionized water, 0.36 g of nickel acetylacetonate, 0.36 g of silica sol, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 200° C. for 24 hours, taking out the mixture, washing a solid product, drying at 120° C. for 12 hours, and calcining in a muffle furnace at 600° C. for 12 hours to obtain the hierarchical-pore-channel NiSAPO-11, i.e., E; and (2) uploading active components under 30-501° C. stirring conditions, dissolving 1.41 g of nickel acetylacetonate, 1 g of lanthanum nitrate and 0.47 g of ammonium meta-tungstate into 30 g of N,N-dimethylformamide, and fully dissolving to obtain a solution T; adding the carrier E to continuously stir for 12 hours, standing for 10 hours, drying in a drying oven at 100° C., calcining the obtained solid powder at 600° C. in an air atmosphere for at least 4 hours, and reducing at 550-6001° C. at hydrogen flow velocity of 200-300 mL/min for at least 3 hours, thereby obtaining the hydroisomerization catalyst, i.e., cat14, for preparing the biological aviation kerosene with castor oil.

Reference Example 6

The purpose is to compare preparation steps of a multi-walled carbon-nanotube composite hierarchical-pore-channel NiAPO-11 catalyst without adding an assistant La with embodiment 6:

(1) a preparation method of multi-walled carbon nanotube composite hierarchical-pore-channel NiAPO-11 comprises the following steps: respectively mixing 15 g of deionized water, 0.36 g of nickel acetylacetonate, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 200° C. for 24 hours, taking out the mixture, washing a solid product, drying at 120° C. for 12 hours, calcining in a muffle furnace at 600° C. for 12 hours to obtain the hierarchical-pore-channel NiAPO-11, i.e., E; dissolving 1 g of a silane coupling agent in 30 g of DMF solvent; adding 1 g of multi-walled carbon nanotube for continuously refluxing and stirring for 1-3 hours, adding the E to reflux and stir at 100-120° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiAPO-11 composite carrier, i.e., F; and (2) uploading active components under 30-50° C. stirring conditions, dissolving 1.41 g of nickel acetylacetonate and 0.29 g of cobalt nitrate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat15, for preparing the biological aviation kerosene with castor oil.

Reference Example 7

The purpose is to compare preparation steps of a multi-walled carbon-nanotube composite hierarchical-pore-channel NiSAPO-11 catalyst without adding an assistant La with embodiment 8:

(1) a preparation method of multi-walled carbon nanotube composite hierarchical-pore-channel NiSAPO-11 comprises the following steps: respectively mixing 15 g of deionized water, 0.36 g of nickel acetylacetonate, 0.36 g of silica sol, 2.07 g of phosphoric acid and 1.28 g of pseudo-boehmite together and uniformly stirring; adding 0.1 g of starch to carry out a hydrolysis reaction and stir for 5 hours, adding 0.54 g of di-n-propylamine and 0.36 g of diisopropylamine and stirring for 3 hours again; and adding the mixture into a high-pressure crystallization kettle with a polytetrafluoro lining, sealing, crystallizing at 2001° C. for 24 hours, taking out the mixture, washing a solid product, drying at 120° C. for 12 hours, calcining in a muffle furnace at 600° C. for 12 hours to obtain the hierarchical-pore-channel NiAPO-11, i.e., E; dissolving 1 g of a silane coupling agent in 30 g of DMF solvent; adding 1 g of multi-walled carbon nanotube for continuously refluxing and stirring for 1-3 hours, adding the E to reflux and stir at 100-120 1° C. for 1-3 hours, performing suction filtration on the obtained mixed solution, drying at 120° C. for 5 hours, and calcining the obtained solid powder in a muffle furnace at 500° C. for 5-10 hours, thereby obtaining the multi-walled carbon nanotube composite hierarchical-pore-channel NiSAPO-11 composite carrier, i.e., F; and (2) uploading active components under 30-50° C. stirring conditions, dissolving 1.41 g of nickel acetylacetonate and 0.45 g of ammonium molybdate into 30 g of N,N-dimethylformamide, and fully dissolving to obtain a solution T; adding the carrier F to continuously stir for 12 hours, standing for 10 hours, drying in a drying oven at 100° C., calcining the obtained solid powder at 600° C. in an air atmosphere for at least 4 hours, and reducing at 550-600° C. at hydrogen flow velocity of 200-300 mL/min for at least 3 hours, thereby obtaining the hydroisomerization catalyst, i.e., cat16, for preparing the biological aviation kerosene with castor oil.

TABLE 1 evaluation results of the catalysts cat1-cat16 are as follows: evaluation conditions of cat1-cat3 include 300° C., 3 MPa and 1-2 h$^{-1}$; and evaluation conditions of cat6-cat16 include 300-360° C., 3 MPa and 1-2 h$^{-1}$. Evaluation standards are as follows: a conversion rate of castor oil and $C_8$-$C_{16}$ selectivity are calculated according to a peak area ratio of gas chromatography; and quality of the catalysts directly affects the conversion rate and selectivity of the aviation kerosene, and also affects life of the catalyst.

| Catalyst | Conversion rate of Caster oil (%) | Liquid yield (%) | Life/h | $C_8$-$C_{16}$ selectivity (%) |
|---|---|---|---|---|
| Cat 1 | 99.5 | 85.7 | 350 | 85.8 |
| Cat 2 | 98.4 | 86.4 | 350 | 85.7 |
| Cat 3 | 98.7 | 87.5 | 284 | 88.6 |
| Cat 4 | 98.7 | 80.2 | 350 | 78.7 |
| Cat 5 | 98.5 | 82.5 | 350 | 80.6 |
| Cat 6 | 97.6 | 86.3 | 350 | 85.6 |
| Cat 7 | 95.7 | 84.5 | 350 | 84.3 |
| Cat 8 | 96.6 | 86.8 | 350 | 90.1 |
| Cat 9 | 99.7 | 87.6 | 296 | 91.5 |
| Cat 10 | 80.3 | 80.6 | 50 | 20.4 |
| Cat 11 | 75.6 | 82.4 | 70 | 32.4 |
| Cat 12 | 68.3 | 86.7 | 60 | 29.7 |
| Cat 13 | 76.4 | 82.6 | 54 | 46.3 |
| Cat 14 | 80.7 | 83.5 | 32 | 68.7 |
| Cat 15 | 78.2 | 86.1 | 46 | 56.0 |
| Cat 16 | 78.2 | 86.1 | 40 | 51.0 |

TABLE 2

Comparison of physical and chemical properties of the biological aviation kerosene of the castor oil with those of biological aviation kerosene of jatropha curcas and jet 3# aviation kerosene:

| Items | Jet 3# | Aviation kerosene of castor oil | Aviation kerosene of jatropha curcas |
|---|---|---|---|
| Freezing point (° C.) | <−47 | −50 | −52 |
| Density (Kg · m$^{-3}$) | 775-830 | 780 | 790 |
| Flash point (° C.) | >38 | 46 | 46 |
| V kinematic viscosity (mm$^2$S$^{-1}$) | <8.0 | 3.5 | 2.6 |
| Sulfur content (%) | <20 ppm | 0 | <20 ppm |
| Olefin content (%) | 1-2 | 0 | <1 |
| Aromatic hydrocarbon content (%) | <1 | 0 | <1 |

Cat1-cat9 in Table 1 are modified catalysts and have extremely high life, conversion rates of castor oil and selectivity of aviation kerosene components, while unmodified catalysts have extremely low conversion rates and selectivity, which indicates that modification of the hydrodeoxygenation catalyst really increases hydrothermal stability, thereby increasing the life of the catalyst. For the hydroisomerization catalyst, due to the introduction of the hierarchical pore channel and multi-walled carbon nanotubes, the life of the catalyst is greatly increased while increasing the selectivity of the aviation kerosene, thereby proving effects after modification.

In Table 2, it can be seen from comparison that all items are within standards except the density. For the density, since the components in the biological aviation kerosene with castor oil are $C_8$-$C_{18}$ alkanes, the density may not exceed 790. However, the biological aviation kerosene can be used when doped with petroleum-based aviation kerosene, so the density after doping may be within the standard.

What is claimed is:

1. A method for preparing a catalyst, the catalyst for preparing biological aviation kerosene with castor oil, comprising porous large-specific surface nano-alumina as a carrier, NixMoW, NixCoW or NixCoMo as an active component, and Mn as an assistant, wherein mass of the active component accounts for 10-30% of total mass of the catalyst; x is an atomic ratio and ranges from 2 to 20; mass of the component Mn accounts for 1-5% of the total mass of the catalyst; and a specific surface area of the porous large-specific surface nano-alumina carrier is 500-800 m2/g;

the method comprising the following steps:
1) adding aluminum isopropoxide into 0.05 mol/L of nitric acid, refluxing and stirring at 80° C. for 3-5 hours, adding cetyl trimethyl ammonium bromide, and continuously stirring for 2-3 hours to obtain a mixed solution;
2) adding sodium silicate into the mixed solution, refluxing and stirring at 80° C. for 3-5 hours, and aging at a room temperature for 2 hours to obtain a mixed solution;
3) adding ethyl orthosilicate into the mixed solution, refluxing and stirring at 80° C. for 3-5 hours, and aging at the room temperature for 2 hours;
4) adding 1-5% of sodium hydroxide into the mixed solution obtained in the step 3), refluxing and stirring at 80° C. for 3-5 hours, performing centrifugal separation, drying the obtained solid precipitate at 100° C., and calcining in a nitrogen atmosphere at 500-600° C. for 4-6 hours, thereby obtaining the large-specific surface nano-alumina carrier;
5) adding an assistant manganese chloride into an aqueous solution in an amount of three times that of mass of the carrier according to a ratio for stirring for 3 hours under room-temperature stirring conditions, adding the large-specific surface nano-alumina carrier for stirring 3-5 hours to obtain a mixed solution, performing suction filtration on the mixed solution, drying a solid product at 100° C. for 8 hours, and calcining in the nitrogen atmosphere at 500-600° C. for 4-6 hours to obtain solid powder; and
6) sequentially adding an active component soluble salt into the aqueous solution of an amount of three times of mass of the carrier according to a ratio for stirring for 3 hours under the room-temperature stirring conditions, adding the solid powder in the step 5) for stirring 3-5 hours to obtain a mixed solution, standing for 10 hours, drying the standing mixed solution at 100° C. for 8 hours, calcining in the nitrogen atmosphere at 500-600° C. for 4-6 hours, and reducing the obtained solid powder at 550-600° C. at hydrogen flow velocity of 200-300 mL/min for at least 3 hours, thereby obtaining the hydrodeoxygenation catalyst for preparing the biological aviation kerosene with castor oil.

2. The method according to claim 1, wherein a molar ratio of various raw materials in the steps 1) to 3) is: the aluminum isopropoxide to the 0.05 mol/L of nitric acid to the cetyl trimethyl ammonium bromide to the sodium silicate to the ethyl orthosilicate is (50-120):1:(0.5-5):(0.5-5):(0.5-5); and the active component soluble salt refers to a combination of nickel nitrate with cobalt nitrate, ammonium metatungstate or ammonium molybdate.

* * * * *